— US 9,783,620 B2

United States Patent
Essers et al.

(10) Patent No.: US 9,783,620 B2
(45) Date of Patent: Oct. 10, 2017

(54) RESISTANT STARCH

(71) Applicant: Nederlandse Organisatie voor Toegepast-Natuurwetenschappelijk Onderzoek TNO, Delft (NL)

(72) Inventors: Maurice Karel Hubertina Essers, Delft (NL); Ricardo Nagtegaal, Delft (NL); Johannes Wilhelmus Timmermans, Delft (NL); Jan Matthijs Jetten, Delft (NL); Theodoor Maximiliaan Slaghek, Delft (NL); Ronald Tako Marinus Van Den Dool, Delft (NL)

(73) Assignee: NEDERLANDSE ORGANISATIE VOOR TOEGEPAST-NATUUR WETENSCHAPPELIJK ONDERZOEK TNO, Delft (NL)

( * ) Notice: Subject to any disclaimer, the term of this patent is extended or adjusted under 35 U.S.C. 154(b) by 0 days.

(21) Appl. No.: 14/428,606

(22) PCT Filed: Sep. 19, 2013

(86) PCT No.: PCT/NL2013/050672
§ 371 (c)(1),
(2) Date: Mar. 16, 2015

(87) PCT Pub. No.: WO2014/046542
PCT Pub. Date: Mar. 27, 2014

(65) Prior Publication Data
US 2015/0274849 A1    Oct. 1, 2015

(30) Foreign Application Priority Data

Sep. 19, 2012   (EP) .................................... 12184999

(51) Int. Cl.
*C08B 30/18*    (2006.01)
*C08B 30/12*    (2006.01)
*A23L 7/10*     (2016.01)

(52) U.S. Cl.
CPC ................ *C08B 30/18* (2013.01); *A23L 7/10* (2016.08); *C08B 30/12* (2013.01); *A23V 2002/00* (2013.01)

(58) Field of Classification Search
CPC ............................... C08B 30/18; C08B 30/12
See application file for complete search history.

(56) References Cited

U.S. PATENT DOCUMENTS 7,189,288 B2 *   3/2007   Stanley .................. A21D 2/186
                                                           127/32
2006/0073263 A1   4/2006   Binder et al.

FOREIGN PATENT DOCUMENTS

CN         101 712 723 A      5/2010

OTHER PUBLICATIONS

English machine translation of CN 101712723, http://translationportal.epo.org/, accessed online on Mar. 30, 2016.*
Robyt et al., Carbohydrate Research, 1996, 281, p. 203-218.*
International Search Report of PCT/NL2013/050672 mailed Feb. 19, 2014.

* cited by examiner

*Primary Examiner* — Jonathan S Lau
(74) *Attorney, Agent, or Firm* — Gilberto M. Villacorta; Sunit Talapatra; Foley & Lardner LLP

(57) ABSTRACT

A colourless resistant starch is produced by a process comprising (i) suspending starch in a C2-C4 alcohol, in particular ethanol, in the presence of 0.01-3.0% (w/w) of acid based on the starch; (ii) heating the suspended starch at a temperature of 70-160° C., in particular 78-120° C., and (c) isolating the resulting product. The resulting starch has a resistant fraction of at least 20%.

16 Claims, No Drawings

RESISTANT STARCH

CROSS-REFERENCE TO RELATED APPLICATIONS

This application is the National Phase of International Patent Application No. PCT/NL2013/050672, filed Sep. 19, 2013, published as WO 2014/046542, which claims priority to European Application No. 12184999.6, filed Sep. 19, 2012. The contents of which are herein incorporated by reference in its entirety.

The invention relates to the production of resistant starches. Such resistant starches find use as functional fibres in food applications.

BACKGROUND

Resistant starch and resistant dextrins are glucose polymers and oligomers generally obtained by heat treatment under acid conditions of starches (pyrodextrination). Such treatment involves different chemical reactions, including hydrolysis, transglucosidation, and repolymerisation. These reactions lead to the formation of random 1→2, 1→3, 1→4, and 1→6 glucosidic linkages. Since the human intestinal enzyme system is not capable of breaking glucosidic linkages other than α-D-(1→4), and α-D-(1→6), the converted dextrins are partly or wholly indigestible and have properties similar to resistant starch. They are functional dietary fibres having beneficial effects, such as stabilising intestinal flora, blunting post-prandial glucose levels and contributing to vascular health. Such resistant dextrins do not fall within three categories (RS 1-RS 3) of resistant starches as originally classified by Englyst et al., Eur. J. Clin. Nutr., 1992, 46 (suppl.), S33-S50. Resistant dextrins of this type are generally grouped among the type 4 resistant starch (RS 4, chemically modified resistant starch), although they have not been treated with other chemicals than acid, contrary to other modified starch such as starch ester and the like.

During acid and heat treatment of the starch (pyrodextrination), the starch gets darker (brown) due to decomposition and side reactions during the process. The resulting impurities are difficult to remove due to the fact that they are partially incorporated in the pyrodextrin structure during the treatment. Therefore these starches need to be purified before use in foodstuff.

U.S. Pat. No. 5,264,568 discloses a tedious multistep process for purification and isolation of a pyrodextrin hydrolysate.

EP 1799719 discloses a process for producing resistant starch by acidifying starch at 3% moisture at pH 2.3 in the presence of 4.3% of ethanol followed by heating at 140° C. This treatment is reported to result in 57.7% resistant starch, which is about an optimum, since lower (0.1%) and higher (8.3%) levels of ethanol result in lower yields (53.6%, 55.6%) of resistant starch. The products of EP 1799719 have a whiteness of 65 (on a scale of 0 to 100).

Hence, there is a need for providing a simplified and cost-effective process that can provide dextrinised starch with less impurities, improved colour properties, thus avoiding the need for any subsequent, extensive purification steps to tackle colour issues.

DESCRIPTION OF THE INVENTION

It was found according to the invention that starch can be dextrinised effectively by heating the starch in an alcohol at moderate temperatures. Surprisingly, the resulting product has an essentially perfect whiteness of at least 90 (on a scale of 0-100 as defined e.g. by the CIE, Commission Internationale de l'Éclairage).

Thus the invention pertains to a process for producing a colourless resistant starch comprising:
(i) suspending starch, i.e. making a slurry, in a C2-C4 alcohol in the presence of 0.01-3.0 wt. % of acid based on the starch;
(ii) heating the suspended starch at a temperature of 70-160° C.;
(iii) isolating the resulting product.

In another aspect, the invention pertains to a colourless resistant starch obtainable by the process of the invention, and to a product, in particular a food product or a medicinal product comprising the same. The colourless resistant starch and its preparation process are described in more detail here below.

The starch to be used in the process of the invention can be any common type of starch, including maize, potato, tapioca, rice, wheat, etc. The product resulting from the process is denoted as a resistant starch, which means that at least part of the product is not digestible as defined below. The term resistant starch as used herein covers resistant dextrins.

The alcohol may be any lower alcohol having up to 4 carbon atoms, such as ethanol, 1-propanol, 2-propanol, methoxyethanol and any of the isomeric butanols. The preferred alcohols are ethanol and 2-propanol, most preferred is ethanol. Mixtures of alcohols, or mixtures with minor (i.e. less than 50% on a weight basis) of other organic solvents, such as ethers, acetone, or the like are also suitable. The alcohol may contain water, up to e.g. 5% (w/w). However, it was found that reducing the water level results in improved fibre contents (degrees of dextrination). Preferred are water levels below 3%, more preferred below 2%, most preferred below 1%. The preferred, low water levels also apply to the water introduced with the starch. It is preferred that the starch contains less than 5 wt. %, preferably less than 3 wt. % of water. These levels can be achieved by pre-drying the starch in a conventional manner. Also, the total amount of water in the dextrination mixture, i.e. in step (ii) of the process of the invention, is preferably limited with respect to the (dry) starch weight level. Preferably, the total amount of water, whether originating from the starch, the alcohol or the acid, is below 25 wt. %, especially below 10 wt. %, more preferably below 7 wt. %, even more preferably below 5 wt. %, and most preferably below 3 wt. % of the amount of dry starch.

The amount of alcohol to be used is at least 20 wt. %, preferably at least 35% on dry starch weight basis (i.e. alcohol:starch at least 20:100=17:83 or at least 35:100=26:74), more preferably at least 50% on dry starch basis, even more preferably at least 100%, or even at least 150% (alcohol to starch ratios (w/w) of higher than 1:2 (33:67), higher than 1:1 (50:50) or higher than 1.5:1 (67:33), respectively), up to 95:5. Although there is no stringency as to the upper limit, amounts of alcohol exceeding 900% or even 400% of the starch amount (i.e. alcohol to starch ratios higher than 9:1 (=90:10) or 4:1 (=80:20)), do not provide significant advantages. In a preferred embodiment, the alcohol to dry starch ratio (w/w) is between 35:100 (26:74) and 95:5, in particular 33:67 to 90:10, more preferably in the range of 40:60 to 80:20, most preferably 40:60 to 65:35. It is generally noted that "between x and y" is technically speaking the same as "from x to y", or "in the range of x to y", or "higher than x and lower than y".

It is important that the alcohol (or the starch) contains a small amount of acid. The minimum amount is 0.01% (w/w) and the maximum amount is about 5% (w/w) on the basis of the dry starch. Depending on the reaction temperatures and times, acid levels of 0.03 to 3% by weight are preferred. More preferably the acid level is 0.1-2%, most preferably 0.15-1.5% (w/w). On the basis of the alcohol, the amount of acid is preferably between 0.01 and 3% (w/w), more preferably 0.05-1% (w/w). The acid may be any acid, preferably an acid which is accepted for food purposes. Examples include hydrochloric acid, phosphoric acid, sulphuric acid, acetic acid, lactic acid, citric acid etc. A relatively strong acid such as hydrochloric acid, sulphuric acid or phosphoric acid is preferred.

The acid may be added to the alcohol, optionally together with water. Although not preferred, in one embodiment the acid may be added to the starch granules, prior to preparing the suspension.

The temperature at which the suspension of starch in the alcohol is treated is at least 70° C. and should not exceed 160° C., preferably not even 130° C. Suitable temperatures are the boiling temperatures of the alcohol at atmospheric or increased pressure (e.g. 1-3 bar), such as 78° C. for ethanol (1 bar) and 82° C. for 2-propanol (1 bar) up to e.g. 120° C. Most preferred temperatures are 80-100° C. In one embodiment, step (ii) is performed at atmospheric pressure conditions, in another embodiment step (ii) is carried out at increased pressure, e.g. between 2 and 5 bar, more preferably between 2.5 and 4 bar.

The heat treatment can be performed depending on the desired degree of dextrination, and depending on the reaction conditions, amount of acid etc. Preferred reaction times are from 5 minutes to 10 hours, preferably 15 minutes to 10 hours, more preferred from 0.5 to 6 hours, most preferred from 1 to 3 h. In one embodiment, the heating time is in the range of 5 minutes to 3 hours, preferably 15 minutes to 3 hours, more preferably 30 minutes to 3 hours. The heat treatment conditions are preferably selected to maintain the granular form of the starch during the heating step.

The resistant starches (or resistant dextrins) which can be obtained with the process of the invention can have a fibre degree, i.e. a percentage of resistance to digestion, defined as the weight proportion not digested within 120 min by α-amylase and amyloglucosidase (AMG) at 60° C., of at least 20%, preferably 20-60%, more preferably between 25 and 50%. The measurement of the fibre content follows the method of Englyst et al. (1992, see above). According to this method, the resistant starch fraction is calculated according to the following formula:

% $RS$ (resistant starch)=(% $TG$–% $TAG$)*0.9 in which $TG$ is the total glucose and $TAG$ the total available glucose after 120 minutes of digestion.

The products of the invention have an excellent whiteness (L* value) of at least 90 on a scale of 0-100, wherein 100 represents absolute whiteness. Whiteness can be determined by conventional equipment measuring UV emissions in the range of 420-720 nm. As examples a Reflectance Colorimeter of HunterLab (Labscan II 0/45) or whiteness meters available from Kett can be suitably used. The excellent whiteness allows the products of the invention to be used without further purification. Alcohol (e.g. ethanol) removal, optional washing and drying are sufficient for arriving at a product which is ready for use.

The resistant starches of the invention can be used for producing pharmaceutical and nutritional compositions to be used for controlling glucose response and insulin response after food ingestion. This is relevant for subjects in need of such control, such as subjects suffering from hyperglycaemia, diabetes type 2, obesity and other glucose- or insulin-associated conditions.

The combination of readily digestible starch (non-dextrinised, i.e. readily available glucose), slowly digestible starch (slowly available glucose) and "real" fibre (non-digestible starch, fully dextrinised), make the product excellently suitable as a food ingredient or food supplement for blunting glucose response (levelling of the peak response while sustaining total glucose uptake) for medicinal or health foods. Thus, the invention further pertains to nutritional products containing the resistant starch of the invention. Such nutritional products including food supplements or food ingredients may be in the form of drinks, powders, bars, and the like, optionally in combinations with further fibres, proteins, vitamins, sweeteners, milk constituents, flavours and the like. Preferred nutritional products contain 0.1-95%, in particular 0.3-60, more in particular 1-40%, by dry weight, of the resistant product of the invention.

EXAMPLES

Materials
   Waxy corn starch
   Ethanol
   HCl (12M)
   10 mM Maleate/NaOH buffer with 1 mM $CaCl_2$ (pH6)
   2M Acetic acid
   Alpha-amylase (Termamyl, Sigma 3403)
   Amyloglucosidase (Megazyme)
Analysis
Hunterlab Lab scan 2, 0/45 was used for determining the whiteness of the starch powder.
Determination of Fibre Content
a. Digestion Dextrinised starch (0.5 g) was weighed in a 50 ml Corning tube. 10 ml of maleate buffer and 10 ml water were added to the starch. The pH was checked and adjusted to 6 with 1M NaOH. The sample has heated to 90° C. until all the starch was gelatinised (approximately 10 min). After cooling to 60° C., 100 μl Termamyl and 20 μl amylo-glucosidase were added. Incubation was continued for 2 hours at 60° C.
b. HPLC Analysis Two TSKgel GMPWxl (7.5 mm×30 cm) columns, arranged in series were used. The system was eluted with MilliQ water at 80° C. and a flow rate of 0.5 mL/min. Samples were injected at 20 μl. A Waters 2410 RI detector was used for determining the concentration of the eluting fractions.

Example 1

Dextrination in Acidic Alcohol Below 100° C. and Atmospheric Pressure

Procedure:
Waxy corn starch (50 g, pre-dried to a moisture content <3% (2.6 wt. %) and 150 g ethanol (100% pure) were added to a glass flask which was connected with a reflux condenser. 2 g HCl (12M)=0.74 g HCl (15 mg per g starch) was added and stirred (magnetic stirrer) and the mixture was boiled under reflux (oil bath temperature 85° C). After 2 hour reaction time, the starch was cooled to room temperature, filtered off (Buchner funnel) and washed with a 70% ethanol/30% water solution. The sample was dried at room temperature.

Appearance: white: whiteness L* value 95 (determined by Hunterlab analysis)
Resistant starch fraction: HPLC analysis reveals a resistant starch fraction of 25% ±5%.
Remark: This example demonstrates that it is possible to dextrinise starch in acidic alcohol at temperatures at least as low as 78° C.

Example 2

Dextrination in an Acidic Alcohol/Water Below 100° C. and Atmospheric Pressure

Procedure: Example 1 was repeated with 150 g of 90% ethanol/10% water instead of 100% ethanol.
Appearance: white: whiteness L* value 95.
Resistant starch fraction: HPLC analysis reveals a resistant starch fraction of approximately 5%.
Remark: This example demonstrates the influence of water in the ethanol phase. The yield in resistant starch is affected negatively by higher water levels in the ethanol phase.

Example 3

Dextrination in Acidic Alcohol at 120° C. Under Pressure

Procedure: Waxy corn starch (50 g, pre-dried to moisture content <3%), 150 g ethanol (100%) and 0.15 g HCl (12M)=0.055 g HCl (1.1 mg HCl per g starch) were introduced into a Parr reactor. The mixture was stirred (1000 rpm) and heated at 120° C. under pressure (3 bar). After 1 hour reaction time, the starch was cooled, filtered off and washed with a 70% ethanol/30% water solution. The sample was dried at room temperature.
Appearance: white; whiteness: L* value 95.
Resistant starch fraction: 30% ±5%.
HPLC analysis reveals a resistant starch fraction of 30% ±5%.
Remark: This example demonstrates the influence of the catalyst and temperature. Less HCl is needed at higher temperatures.

Example 4

Dextrination in Acidic Alcohol at 120° C. Under Pressure (2)

Procedure: Example 3 was repeated, but with a reaction time of 3 hours instead of 1 hour.
Resistant fraction: 35% ±5%.
Appearance: white; whiteness: L* value 95.
Remark: This example demonstrates that the formation of the resistant starch fraction took place mostly within 1 hour, since there is only a 5% increase in the last two hours.

Example 5

Dextrination in Acidic Alcohol Under Pressure (3)

Procedure: Example 3 was repeated, but with 70 g starch and 130 g ethanol instead of 50 and 150 g respectively.
Resistant fraction: 40% +5%
Appearance: white; whiteness: L* value 95.

Example 6

Dextrination in Acidic Alcohol Under Pressure (4)

Procedure: Example 3 was repeated, but with 50 g ethanol instead of 150 g.
Resistant starch fraction: 48%±5%
Appearance: white; whiteness: L* value 95.
Remark: Examples 5 and 6 demonstrate that the ratio ethanol:starch:acid catalyst influences the resistant starch yield.

Example 7

Dextrination in Acidic Alcohol Under Pressure (5)

Procedure: Example 6 was repeated, with the only difference that the starch had a moisture content of 12%, instead of less than 3%.
Resistant starch fraction: none; the starch fraction was completely converted and dissolved in the ethanol phase.
Remark: This experiment shows the influence of the initial moisture level of the starch on the reaction efficiency and yield in resistant starch. Pre-drying is important.

Example 8

Dextrination in Acidic Alcohol Using the Procedure of EP 1799719; lower ethanol level Waxy corn starch (50 g, pre-dried to <3% moisture) was acidified with an acid/ethanol mixture (20 µl HCl (12M) and 23 µl of 190 proof ethanol per gram starch =8.7 mg HCl, 15 mg water and 17 mg ethanol per g starch). The starch mixture was then heated to 140° C. The reaction was monitored on colour development. After a certain whiteness was reached (visual observation), a sample was taken for further evaluation (L* value and resistant starch level).

| Experiment | L* value (Hunterlab) | Resistant starch fraction (%) |
| --- | --- | --- |
| 8-1 | 95 | 0 |
| 8-2 | 82 | 16 |
| 8-3 | 72 | 35 |
| 8-4 | 65 | 51 |
| 8-5 | 55 | 60 |

Remark: The correlation between the formation of resistant starch and colour components is evident and therefore colorisation cannot be avoided by use of this procedure. Use of the conditions according to the present invention (ethanol-starch slurry procedure) allows to avoid colour formation during production of the resistant starch (see example 1-7).

Example 9

Dextrination in Acidic Alcohol/Water (5) Using the Procedure of EP 1799719; lower level ethanol.

Waxy corn starch (50 g, pre-dried to moisture content <3%). Prior to dextrination the starch was acidified with an acid/ethanol-water mixture (20 µl HCl (12M), 23 µl 190 proof ethanol and 0, 40 or 80 µl water per gram starch).

| Experiment | Water (µl) added per gram starch | L* Value after 60 minutes | Resistant starch fraction (%) |
|---|---|---|---|
| 9-1 | 0 (15)# | 77 | 33 |
| 9-2 | 40 (55)# | 73 | 29 |
| 9-3 | 80 (95)# | 69 | 22 | values in parentheses include water from acid and ethanol

Remark: This example demonstrates the role of water in the dextrination procedure of EP 1799719. Higher levels of water in the system induce colorisation (lower L* value) and a decline of the yield of resistant starch. Therefore, less colorisation which is claimed by use of this procedure, can therefore not be attributed to the use of ethanol but more to the amount of water.

The invention claimed is:

1. A process for producing a resistant starch, comprising:
  (i) suspending starch in a C2-C4 alcohol in the presence of 0.01-3.0% (w/w) of acid, based on the starch, wherein the alcohol contains less than 5% (w/w) of water and the amount of alcohol is at least 50 wt % on dry starch basis;
  (ii) heating the suspended starch at a temperature of 70-160° C.;
  (iii) isolating the resulting product;
  wherein the total amount of water in step (ii), whether originating from the starch, the alcohol or the acid, is below 25 wt. % of the amount of dry starch.

2. The process according to claim 1, wherein the alcohol contains less than 3% (w/w) of water.

3. The process according to claim 2, wherein the alcohol contains less than 1% (w/w) of water.

4. The process according to claim 1, wherein the alcohol to dry starch ratio (w/w) in step (i) is between 35:100 and 95:5.

5. The process according to claim 4, wherein the alcohol to dry starch ratio (w/w) in step (i) is between 33:67 and 80:20.

6. The process according to claim 1, wherein the alcohol is ethanol.

7. The process according to claim 1, wherein step (ii) is performed at atmospheric pressure conditions.

8. The process according to claim 1, wherein step (ii) is performed at increased pressure.

9. The process according to claim 1, wherein the alcohol contains 0.01-1.5 wt. %, based on the starch, of acid.

10. The process according to claim 1, wherein the starch, as introduced in step (i), contains less than 5 wt. % of water.

11. The process according to claim 10, wherein the starch, as introduced in step (i), contains less than 3 wt. % of water.

12. The process according to claim 1, wherein the suspended starch is heated to 78-130° C. in step (ii).

13. The process according to claim 1, wherein the heating in step (ii) is continued for 5 minutes-10 hours.

14. The process according to claim 1, wherein the resistant starch fraction in the isolated product is at least 20%.

15. The process according to claim 1, wherein the starch is maintained in granular form during the heating step.

16. The process according to claim 1, wherein the resistant starch has a whiteness of at least 90.

* * * * *